(12) United States Patent
Ende

(10) Patent No.: US 6,568,088 B1
(45) Date of Patent: May 27, 2003

(54) WHEEL ATTACHMENT FOR PORTABLE POWER CUTTING TOOLS

(76) Inventor: Mathias Am Ende, 11946 Avon Way, No. 5, Los Angeles, CA (US) 90066

(*) Notice: Subject to any disclaimer, the term of this patent is extended or adjusted under 35 U.S.C. 154(b) by 0 days.

(21) Appl. No.: 10/094,192

(22) Filed: Mar. 7, 2002

(51) Int. Cl.[7] .......................... B23D 59/00; B23D 51/02
(52) U.S. Cl. .............................. 30/371; 30/390; 30/391
(58) Field of Search ........................... 30/371, 390, 391

(56) References Cited

U.S. PATENT DOCUMENTS

| | | | | |
|---|---|---|---|---|
| 1,428,506 A | * | 9/1922 | Krebs | 280/47.32 |
| 1,563,844 A | * | 12/1925 | Gerlach | 30/371 |
| 2,673,725 A | * | 3/1954 | Coates | 280/47.34 |
| 2,736,311 A | * | 2/1956 | Coates | 125/13.01 |
| 4,456,303 A | * | 6/1984 | Due | 125/14 |
| 4,891,858 A | * | 1/1990 | Wachter | 15/93.1 |
| 4,921,308 A | * | 5/1990 | Yelton et al. | 280/124.166 |
| 4,938,201 A | * | 7/1990 | Chiuminatta et al. | 125/13.01 |
| 5,305,729 A | * | 4/1994 | Chiuminatta et al. | 30/371 |
| 5,381,780 A | * | 1/1995 | Yelton et al. | 125/13.01 |
| 5,540,210 A | * | 7/1996 | Jones | 125/13.01 |
| 5,669,371 A | * | 9/1997 | Rupprecht et al. | 125/13.01 |
| 5,785,293 A | * | 7/1998 | Ford et al. | 280/43 |
| 5,826,893 A | * | 10/1998 | Snoeyenbos | 280/43 |
| 6,019,433 A | * | 2/2000 | Allen | 125/13.01 |
| 6,079,931 A | * | 6/2000 | English et al. | 280/79.11 |
| 6,109,625 A | * | 8/2000 | Hewitt | 280/43.24 |
| 6,112,736 A | * | 9/2000 | Bearden | 30/371 |
| 6,179,542 B1 | * | 1/2001 | Haven | 280/43.2 |
| 6,345,829 B1 | * | 2/2002 | Mueller | 280/47.18 |
| 6,349,712 B1 | * | 2/2002 | Halstead | 30/371 |
| 6,478,666 B1 | * | 11/2002 | Berger et al. | 30/371 |

* cited by examiner

Primary Examiner—Allan N. Shoap
Assistant Examiner—Jason Prone
(74) Attorney, Agent, or Firm—Thomas I. Rozsa; Tony D. Chen

(57) ABSTRACT

A wheel attachment apparatus for a portable circular saw having a circular blade driven by a motor for cutting a workpiece into a cut-off portion and a remaining portion during a cutting process. The wheel attachment apparatus includes a flat bottom plate attached to the circular saw and to be placed above the working piece to support the circular saw during the cutting process, and having a slot opening to allow the circular blade of the circular saw to pass through for cutting the workpiece under the bottom plate. A set of roller wheels is attached to the bottom plate such that when the circular saw is used to cut the workpiece, the set of wheels is brought into contact with the workpiece and elevates the bottom plate so that there is no contact between the bottom plate and the workpiece and instead the wheels are rolling on the workpiece to reduce any friction between the bottom plate and the workpiece and ease the movement of the circular saw during the cutting process. The wheels are positioned and aligned in a way such that they are all on the same side of the circular blade as the remaining portion of the workpiece so that they are always rolling on the remaining portion of the workpiece to ensure that the circular saw is always firmly supported by the remaining portion throughout the cutting process, even when the cut-off portion becomes lose and separated from the remaining portion of the workpiece.

20 Claims, 3 Drawing Sheets

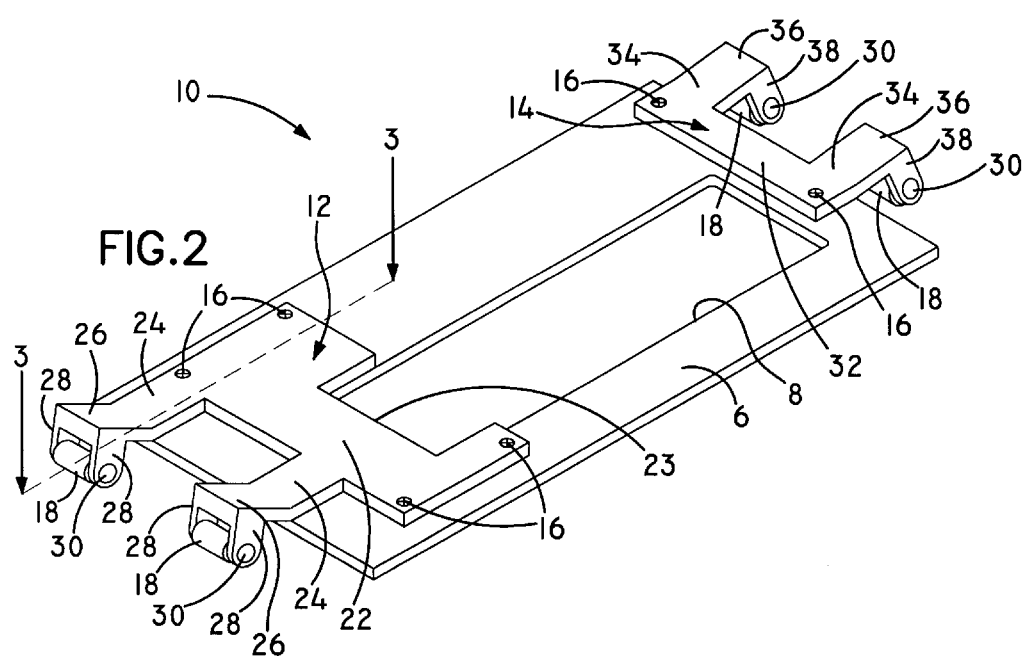
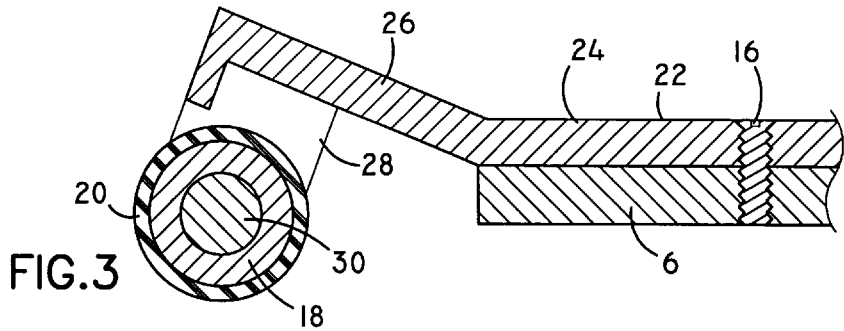
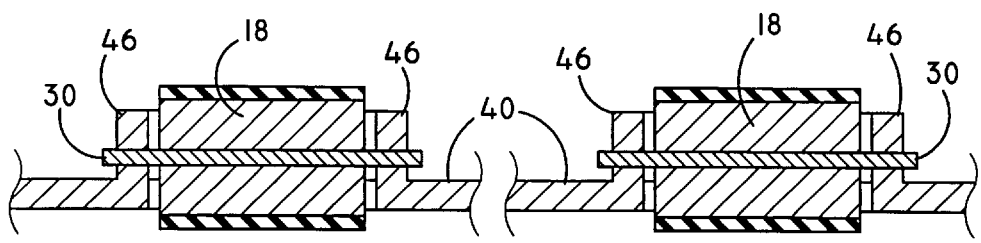

WHEEL ATTACHMENT FOR PORTABLE POWER CUTTING TOOLS

BACKGROUND OF THE INVENTION

1. Field of the Invention

The present invention relates generally to the field of portable power cutting tools. More particularly, the present invention relates to the field of attachment plates for assisting the movement of portable power circular saws.

2. Description of the Prior Art

Portable power circular saws are widely used. Most conventional circular saws come with a flat plate attached to the bottom of the circular saw. When the circular saw is in use to cut a workpiece, the bottom plate of the circular saw comes in contact with the workpiece and slides on the workpiece as the circular saw is moving forward along the cutting direction. However, this often requires extra effort from the user of the circular saw to overcome the friction between the bottom pate of the circular saw and the workpiece.

It is highly desirable to provide a wheel attachment apparatus that attaches roller wheels to the bottom plate of a circular saw that reduce the friction between the bottom plate and the workpiece being cut. It is also desirable to provide a wheel attachment apparatus that can be an after-market item for quick and easy installation on existing circular saws to provide a set of wheels attached to the bottom plate of a circular saw to reduce the friction between the bottom plate and the workpiece.

BRIEF SUMMARY OF THE INVENTION

The present invention is a novel and unique wheel attachment apparatus for a portable power cutting tool.

It is an object of the present invention to provide a wheel attachment apparatus that is attached to the bottom plate of a circular saw for reducing the friction between the bottom plate and the workpiece being cut.

It is also object of the present invention to provide a wheel attachment apparatus that attaches wheels to the bottom plate of a circular saw, where the wheels are positioned and aligned such that they will always ride on the remaining portion of the workpiece being cut, so that the circular saw is continuously supported throughout the cutting process even when the cut-off portion of the workpiece being cut becomes lose and separated from the remaining portion of the workpiece being cut.

It is another object of the present invention to provide a wheel attachment apparatus that is an after-market item for quick and easy installation on existing circular saws to provide a set of wheels attached to the bottom plate of a circular saw to reduce the friction between the bottom plate and the workpiece being cut.

It is a further object of the present invention to provide a wheel attachment apparatus that is an original equipment manufacture (OEM) item that comes with new circular saws which provides a set of wheels attached to the bottom plate of a circular saw for reducing the friction between the bottom plate and the workpiece being cut.

Described briefly in general terms, the wheel attachment apparatus of the present invention is designed for a portable power cutting tool having a cutting blade driven by a power unit for cutting a workpiece into a cut-off portion and a remaining portion. The power cutting tool has a bottom plate which is to be placed above the working piece to support the cutting tool during a cutting process. The wheel attachment apparatus include two wheel mounting pieces for supporting a set of roller wheels. The wheel mounting pieces are attached to the bottom plate and each has a mounting portion and two outward extending arms. A respective one of the wheels is pivotally mounted to each outward extending arm.

When the cutting tool is used to cut the workpiece, the set of wheels is brought into contact with the workpiece and elevates the bottom plate so that there is no contact between the bottom plate and the workpiece and instead the wheels are rolling on the workpiece to reduce any friction between the bottom plate and the workpiece and ease the movement of the power tool during the cutting process.

In addition, the wheels are positioned and aligned in a way such that they are all on the same side of the cutting blade as the power unit so that they are always rolling on the remaining portion of the workpiece to ensure that the power tool is always firmly supported by the remaining portion of the workpiece throughout the cutting process, even when the cut-off portion of the workpiece becomes lose and separated from the remaining portion of the workpiece.

The present invention has many advantages. It provides a set of wheels attached to the bottom plate of a circular saw to reduce the friction between the bottom plate and the workpiece being cut. It can be an OEM item where the wheels are pre-installed on the bottom plate of new circular saws, or an after-market item where the wheels can be installed on the bottom plate of existing circular saws. An important novel feature and advantage of the present invention wheel attachment apparatus is the positioning and alignment of the wheels which ensure that the wheels will always ride on the remaining portion of the workpiece being cut. As a result, even when the cut-off portion of the workpiece being cut becomes lose and separated from the remaining portion of the workpiece being cut, the circular saw is continuously supported by the remaining portion of the workpiece being cut throughout the cutting process.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 2 is a perspective view of the present invention wheel attachment apparatus attached to a bottom plate of a portable power circular saw tool;

FIG. 3 is a partial cross-sectional view taken along line 3—3 of FIG. 2;

FIG. 5 is a cross-sectional view taken along line 5—5 of FIG. 4; and

DETAILED DESCRIPTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
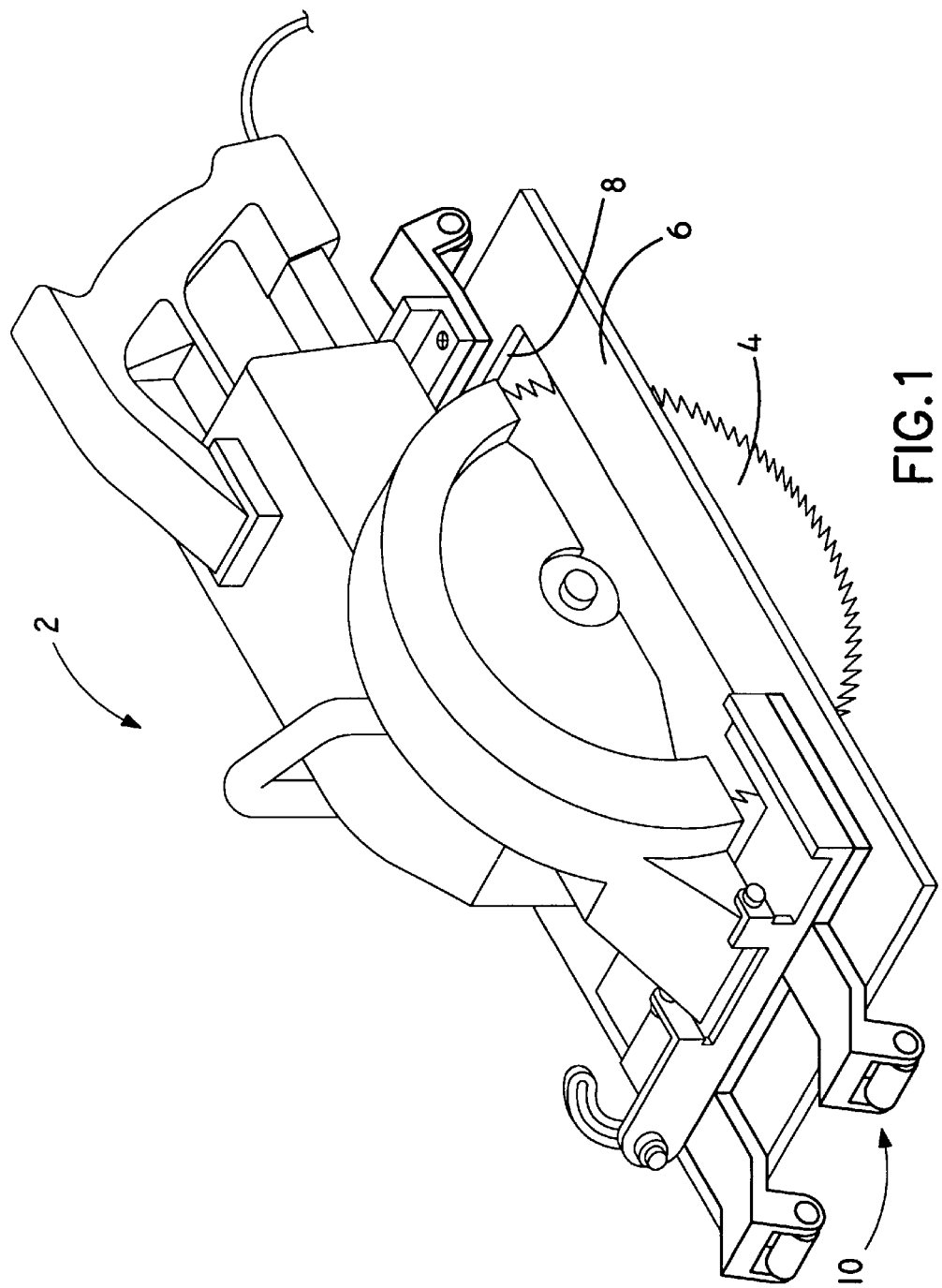
FIG. 1 is a perspective view of a portable power circular saw tool which is provided with the present invention wheel attachment apparatus.

Referring to FIG. 1, there is shown a portable power circular saw tool 2 which is provided with the present invention wheel attachment apparatus 10. Typically the circular saw 2 has a circular blade 4 for cutting a workpiece (now shown) and a flat bottom plate 6 which rests on the workpiece to support the circular saw 2. The bottom plate 6 has a slot opening 8 which allows the circular blade 4 to pass through for cutting the workpiece under the bottom plate 6.

Referring to FIGS. 1, 2 and 3, in one of the preferred embodiment of the present invention, the wheel attachment apparatus 10 includes a front wheel mounting piece 12 and a rear wheel mounting piece 14 mounted to the bottom plate 6 of the circular saw 2 by a set of screws (or bolts or pins) 16 for supporting a set of roller wheels 18. The roller wheels 18 are preferably made of rigid material such as metal or plastic. However, each wheel 18 may be covered by a layer 20 made of rubber-like elastic flexible material to increase the traction of the roller wheel.

The front mounting piece 12 has a flat mounting portion 22 which rests on the bottom plate 6 and is fixedly attached thereto by several (e.g., four) evenly spaced apart mounting screws (or bolts or pins) 16. The flat mounting portion 22 has a cut-out portion 23 that matches the slot opening 8 of the bottom plate 6.

The front mounting piece 12 also has two forward extending parallel arms 24. Each forward extending arm 24 has an upwardly bent end portion 26. The bent end portion 26 has two opposite downward extending wheel axle supporting members 28. A roller wheel 18 is mounted between the two supporting members 28 by a press-fitted axle 30 (or pin-screws).

The rear mounting piece 14 is also mounted to the bottom plate 6 of the circular saw 2 by a set of screws (or bolts or pins) 16 for supporting another set of roller wheels 18. The rear mounting piece 14 has a flat mounting portion 32 which rests on the bottom plate 6 and is fixedly attached thereto by several (e.g., four) evenly spaced apart mounting screws (or bolts or pins) 16. The rear mounting piece 32 has two rearward extending parallel arms 34. Each rearward extending arm 34 has an upwardly bent end portion 36. The bent end portion 36 has two opposite downward extending wheel axle supporting members 38 for mounting a roller wheel 18 therebetween by a press-fitted axle 30 (or pin-screws).

Figure 4:
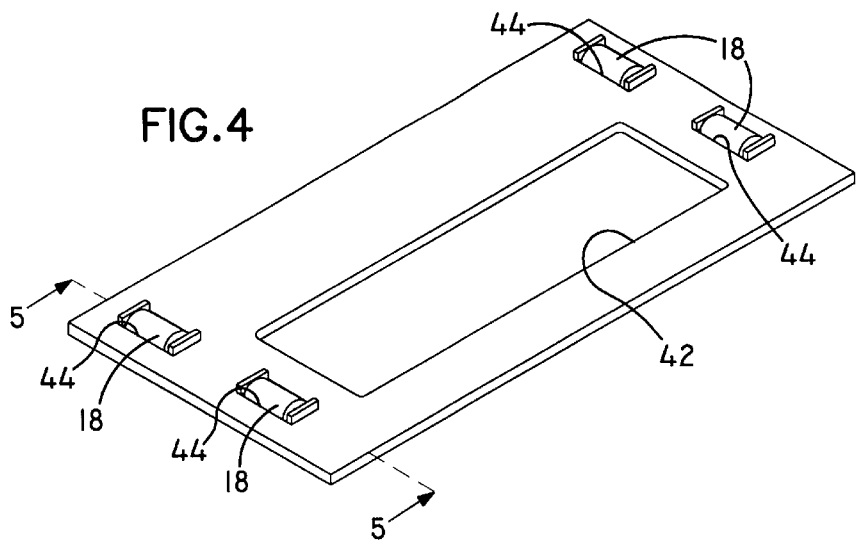
FIG. 4 is a perspective view of an alternative embodiment of the present invention wheel attachment apparatus where the bottom plate of a portable power circular saw tool is provided with roller wheels.

The embodiment shown in FIGS. 1, 2 and 3 is designed to be an after-market item that can be easily installed onto existing circular saws. Referring to FIGS. 4 and 5, there is shown an alternative embodiment of the present invention which is designed to be an original equipment manufacture (OEM) item that is readily provided on new circular saws. In this embodiment, a new circular saw (not shown) will come with "wheeled" bottom plate 40 that is otherwise identical to the conventional bottom plate 6, except roller wheels 18 are now pre-assembled on the bottom plate 40.

The "wheeled" bottom plate 40 has a similar slot opening 42 for allowing the circular blade 4 of the circular saw (not shown here) to pass through. In addition, bottom plate 40 has several wheel slots 44 each for accommodating a roller wheel 18. A pair of upward extending wheel axle support members 46 are provided at the opposite traverse edges of each wheel slot 44 for mounting a respective roller wheel with press-fitted axle 30 (or pin-screws).

One of the advantages of the present invention is that with the-wheels 18 attached to the bottom plate of a circular saw, when the circular saw is use to cut a workpiece, the wheels are brought into contact with the workpiece and "elevate" the bottom plate so that there is no contact between the bottom plate and the workpiece. Instead, the wheels are rolling on the workpiece. This eliminates the sliding friction between the bottom plate and the workpiece and substantially eases the effort in pushing the circular saw forward along the cutting direction.

Figure 6:
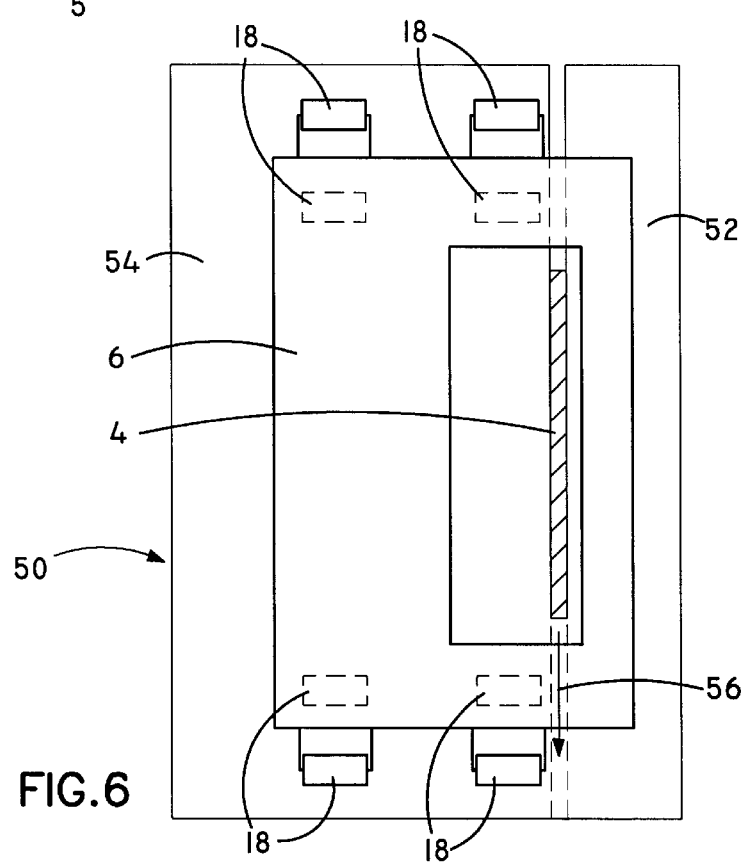
FIG. 6 is a top plane view showing the positioning and alignment of the roller wheels of the present invention wheel attachment apparatus.

Referring to FIG. 6, preferably four (4) wheels are used in the present invention apparatus in a balanced fashion, including a pair of front end wheels and a pair of rear end wheels, with one of the front end wheels longitudinally aligned with one of the rear end wheels and the other one of the front end wheels longitudinally aligned with the other one of the rear end wheels. In FIG. 6, the solid blocks 18 show the position of the wheels in the embodiment shown in FIGS. 1, 2 and 3 as described above, and the dotted blocks 18 showing the position of the wheels in the alternative embodiment shown in FIGS. 4 and 5 as described above.

When a working piece 50 is to be cut into two pieces including a cut-off portion 52 and a remaining portion 54 along a cutting line 56, the remaining portion 54 is typically firmly supported and remains stationary, while the cut-off portion 52 will become lose and separated from the remaining portion 54. One of the important novel features of the present invention is that the wheels 18 are positioned and aligned in such a way that they will all be on the motor side of the cutting blade 4 (i.e., left side in FIG. 6), so that the wheels 18 are all riding on the remaining portion 54 of the workpiece 50. This ensures that the circular saw is always firmly supported by the remaining portion 54 throughout the cutting process, even when the cut-off portion 52 becomes lose and separated from the remaining portion 54.

The present invention conforms to conventional forms of manufacture or any other conventional way known to one skilled in the art. For example, the front mounting piece 12 and the rear mounting piece 14 can be made of metal or any other suitable material.

Defined in detail, the present invention is a wheel attachment apparatus for a portable power circular saw having a circular blade driven by a motor for cutting a workpiece into a cut-off portion and a remaining portion, and a bottom plate to be placed above the working piece to support the circular saw during a cutting process, the wheel attachment apparatus comprising: (a) a pair of wheel mounting pieces for supporting a set of roller wheels; (b) means for mounting the pair of wheel mounting pieces to the bottom plate at spaced apart and opposite locations; (c) the pair of wheel mounting pieces each having a flat mounting portion fixedly attached to the bottom plate by the mounting means, and two outward extending parallel arms each having an upwardly bent end portion with two opposite downward extending wheel axle supporting members; (d) means for mounting the set wheels to the pair of wheel mounting pieces where a respective one of the set of wheels is pivotally mounted between the two opposite wheel axle supporting members of each outward extending arm of each the wheel mounting piece, such that when the circular saw is used to cut the workpiece, the set of wheels are brought into contact with the workpiece and elevate the bottom plate so that there is no contact between the bottom plate and the workpiece and instead the wheels are rolling on the workpiece to reduce any friction between the bottom plate and the workpiece and ease the movement of the circular saw during the cutting process; and (e) the wheels positioned and aligned in a way such that they are all on the same side of the circular blade as the motor so that they are always rolling on the remaining portion of the workpiece to ensure that the circular saw is always firmly supported by the remaining portion throughout the cutting process, even when the cut-off portion becomes lose and separated from the remaining portion of the workpiece.

Defined broadly, the present invention is a wheel attachment apparatus for a portable power cutting tool having a cutting blade driven by a power unit for cutting a workpiece into a cut-off portion and a remaining portion, and a bottom plate to be placed above the working piece to support the cutting tool during a cutting process, the wheel attachment apparatus comprising: (a) at least one wheel mounting piece for supporting a set of roller wheels; (b) means for mounting the at least one wheel mounting piece to the bottom plate; (c) the at least one wheel mounting piece having a mounting portion fixedly attached to the bottom plate by the mounting means, and at least two outward extending arms; (d) means for mounting the set wheels to the outward extending arms where a respective one of the set of wheels is pivotally mounted to each outward extending arm of the at least one wheel mounting piece, such that when the cutting tool is used to cut the workpiece, the set of wheels are brought into contact with the workpiece and elevate the bottom plate so that there is no contact between the bottom plate and the workpiece and instead the wheels are rolling on the workpiece to reduce any friction between the bottom plate and the workpiece and ease the movement of the power tool during the cutting process; and (e) the wheels positioned and aligned in a way such that they are all on the same side of the cutting blade as the power unit so that they are always rolling on the remaining portion of the workpiece to ensure that the power tool is always firmly supported by the remaining portion throughout the cutting process, even when the cut-off portion becomes lose and separated from the remaining portion of the workpiece.

Defined more broadly, the present invention is a wheel attachment apparatus for a portable circular saw having a circular blade driven by a motor for cutting a workpiece into a cut-off portion and a remaining portion during a cutting process, the wheel attachment apparatus comprising: (a) a flat bottom plate attached to the circular saw and to be placed above the working piece to support the circular saw during the cutting process, and having a slot opening to allow the circular blade of the circular saw to pass through for cutting the workpiece under the bottom plate; (b) means for attaching a set of roller wheels to the bottom plate such that when the circular saw is used to cut the workpiece, the set of wheels are brought into contact with the workpiece and elevate the bottom plate so that there is no contact between the bottom plate and the workpiece and instead the wheels are rolling on the workpiece to reduce any friction between the bottom plate and the workpiece and ease the movement of the circular saw during the cutting process; and (c) the wheels positioned and aligned in a way such that they are all on the same side of the circular blade as the remaining portion of the workpiece so that they are always rolling on the remaining portion of the workpiece to ensure that the circular saw is always firmly supported by the remaining portion throughout the cutting process, even when the cut-off portion becomes lose and separated from the remaining portion of the workpiece.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A wheel attachment apparatus for a portable power circular saw having a circular blade driven by a motor for cutting a workpiece into a cut-off portion and a remaining portion, and a bottom plate to be placed above the working piece to support the circular saw during a cutting process, the wheel attachment apparatus comprising:
  a. a pair of wheel mounting pieces for supporting a set of roller wheels;
  b. means for mounting said pair of wheel mounting pieces to said bottom plate at spaced apart and opposite locations;
  c. said pair of wheel mounting pieces each having a flat mounting portion fixedly attached to said bottom plate by said-mounting means, and two outward extending parallel arms each having an upwardly bent end portion with two opposite downward extending wheel axle supporting members;
  d. means for mounting said set wheels to said pair of wheel mounting pieces where a respective one of said set of wheels is pivotally mounted between said two opposite wheel axle supporting members of each outward extending arm of each said wheel mounting piece, such that when said circular saw is used to cut said workpiece, said set of wheels is brought into contact with said workpiece and elevates said bottom plate so that there is no contact between said bottom plate and said workpiece and instead said wheels are rolling on said workpiece to reduce any friction between said bottom plate and said workpiece and ease the movement of said circular saw during said cutting process; and
  e. said wheels positioned and aligned in a way such that they are all on the same side of said circular blade as said motor so that they are always rolling on said remaining portion of said workpiece to ensure that said circular saw is always firmly supported by said remaining portion throughout said cutting process, even when said cut-off portion becomes lose and separated from said remaining portion of said workpiece.

2. The wheel attachment apparatus in accordance with claim 1, wherein said means for mounting said pair of wheel mounting pieces to said bottom plate includes screws.

3. The wheel attachment apparatus in accordance with claim 1, wherein said means for mounting said set wheels to said pair of wheel mounting pieces includes press-fitted axle.

4. The wheel attachment apparatus in accordance with claim 1, wherein said pair of wheel mounting pieces are made of metal material.

5. The wheel attachment apparatus in accordance with claim 1, wherein said set of wheels are made of metal material.

6. The wheel attachment apparatus in accordance with claim 5, wherein each one of said set of wheels is covered with a layer of elastic flexible material.

7. A wheel attachment apparatus for a portable power cutting tool having a cutting blade driven by a power unit for cutting a workpiece into a cut-off portion and a remaining portion, and a bottom plate to be placed above the working piece to support the cutting tool during a cutting process, the wheel attachment apparatus comprising:

a. at least one wheel mounting piece for supporting a set of roller wheels;
   b. means for mounting said at least one wheel mounting piece to said bottom plate;
   c. said at least one wheel mounting piece having a mounting portion fixedly attached to said bottom plate by said mounting means, and at least two outward extending arms;
   d. means for mounting said set wheels to said outward extending arms where a respective one of said set of wheels is pivotally mounted to each outward extending arm of said at least one wheel mounting piece, such that when said cutting tool is used to cut said workpiece, said set of wheels is brought into contact with said workpiece and elevates said bottom plate so that there is no contact between said bottom plate and said workpiece and instead said wheels are rolling on said workpiece to reduce any friction between said bottom plate and said workpiece and ease the movement of said power tool during said cutting process; and
   e. said wheels positioned and aligned in a way such that they are all on the same side of said cutting blade as said power unit so that they are always rolling on said remaining portion of said workpiece to ensure that said power tool is always firmly supported by said remaining portion throughout said cutting process, even when said cut-off portion becomes lose and separated from said remaining portion of said workpiece.

8. The wheel attachment apparatus in accordance with claim 7, wherein said means for mounting said at least one wheel mounting piece to said bottom plate includes screws.

9. The wheel attachment apparatus in accordance with claim 7, wherein said means for mounting said set wheels to said outward extending arms includes two opposite downward extending wheel axle supporting members at an end portion of each outward extending arm.

10. The wheel attachment apparatus in accordance with claim 9, wherein said means for mounting said set wheels to said outward extending arms further includes a press-fitted axle for pivotally mounting a respective wheel between said two opposite downward extending wheel axle supporting members.

11. A wheel attachment apparatus for a portable circular saw having a circular blade driven by a motor for cutting a workpiece into a cut-off portion and a remaining portion during a cutting process, the wheel attachment apparatus comprising:

a. a flat bottom plate attached to said circular saw and to be placed above said working piece to support said circular saw during said cutting process, and having a slot opening to allow said circular blade of said circular saw to pass through for cutting said workpiece under the bottom plate;
   b. means for attaching a set of roller wheels to said bottom plate such that when said circular saw is used to cut said workpiece, said set of wheels is brought into contact with said workpiece and elevates said bottom plate so that there is no contact between said bottom plate and said workpiece and instead said wheels are rolling on said workpiece to reduce any friction between said bottom plate and said workpiece and ease the movement of said circular saw during said cutting process; and
   c. said wheels positioned and aligned in a way such that they are all on the same side of said circular blade as said remaining portion of said workpiece so that they are always rolling on said remaining portion of said workpiece to ensure that said circular saw is always firmly supported by said remaining portion throughout said cutting process, even when said cut-off portion becomes lose and separated from said remaining portion of said workpiece.

12. The wheel attachment apparatus in accordance with claim 11, wherein said means for attaching said set of roller wheels to said bottom plate include a set of apertures on said bottom plate at spaced apart and opposite locations for accommodating said set of roller wheels.

13. The wheel attachment apparatus in accordance with claim 12, wherein said means for attaching said set of roller wheels to said bottom plate further include two wheel axle supporting members provided at opposite edges of each said set of apertures for mounting a respective one of said set of roller wheels.

14. The wheel attachment apparatus in accordance with claim 13, wherein said means for attaching said set of roller wheels to said bottom plate further include two wheel axle supporting members provided at opposite edges of each said set of apertures for mounting a respective one of said set of roller wheels.

15. The wheel attachment apparatus in accordance with claim 11, wherein said means for attaching said set of roller wheels to said bottom plate include at least one wheel mounting piece for supporting said set of roller wheels and means for mounting the at least one wheel mounting piece to said bottom plate.

16. The wheel attachment apparatus in accordance with claim 15, wherein said at least one wheel mounting piece has a mounting portion fixedly attached to said bottom plate, and at least two outward extending arms for supporting said set of roller wheels.

17. The wheel attachment apparatus in accordance with claim 16, wherein each said outward extending arm includes two opposite downward extending wheel axle supporting members at an end portion of said each outward extending arm.

18. The wheel attachment apparatus in accordance with claim 17, wherein said means for mounting said set wheels to said bottom plate further includes a press-fitted axle for pivotally mounting a respective wheel between said two opposite downward extending wheel axle supporting members.

19. The wheel attachment apparatus in accordance with claim 11, wherein said set of wheels are made of metal material.

20. The wheel attachment apparatus in accordance with claim 12, wherein each one of said set of wheels is covered with a layer of elastic flexible material.

* * * * *